July 9, 1968  H. GRAM  3,391,548
HELICAL CONVEYOR REFRIGERATION APPARATUS
Filed March 6, 1967  4 Sheets-Sheet 1

INVENTOR
Hans Gram

BY
Watson, Cole, Grindle + Watson
ATTORNEYS

July 9, 1968     H. GRAM     3,391,548
HELICAL CONVEYOR REFRIGERATION APPARATUS

Filed March 6, 1967     4 Sheets-Sheet 3

INVENTOR
Hans Gram

BY watson, Cole, Grindle + watson
ATTORNEYS

United States Patent Office 3,391,548
Patented July 9, 1968

3,391,548
HELICAL CONVEYOR REFRIGERATION APPARATUS
Hans Gram, Vojens, Denmark, assignor to Brodrene Gram A/S, Vojens, Denmark
Filed Mar. 6, 1967, Ser. No. 620,823
Claims priority, application Denmark, Mar. 11, 1966, 1,274/66
1 Claim. (Cl. 62—381)

ABSTRACT OF THE DISCLOSURE

A refrigerating apparatus, in which articles to be refrigerated are conveyed in a helical path between an insulated cylindrical housing and a cylindrical jacket mounted therein, while at the same time cold air is circulated substantially axially through the space between the cylindrical housing and the cylindrical jacket by means of a refrigerating unit mounted inside said jacket.

Background of the invention

This invention relates to a refrigerating apparatus of the kind in which articles to be refrigerated, e.g., frozen, are conveyed through a refrigerating space of annular form wherein transporting means are provided and to which cold air is supplied from a refrigerating unit.

Freezing apparatus of this kind are known in which the articles are conveyed through the refrigerating space by transporting means passed through the apparatus or returned within the apparatus from one end of the refrigerating space to the other. These freezing apparatus require cooling of the passing transport means or considerable space for returning the transport means within the apparatus.

It is an object of the invention to reduce the space and the amounts of insulation required for such apparatus.

Summary of the invention

According to the invention the apparatus is so constructed that the articles are conveyed within the annular space by means of two sets of rails, one of which is stationary and the other of which is supported by means of the conical jacket and is moved upwardly in order to lift the articles from the stationary set of rails moved in the circumferential direction of the space and lowered in order to place the articles upon the fixed set of rails and then returned to the starting position so that the articles are moved stepwise along the fixed rails. Transporting means passing through the apparatus or conveying means in the form of endless belts or chains to be transported from one end of the space to the other within the apparatus are avoided.

In a preferred embodiment of the invention the helical path is formed between the inner wall of a cylindrical insulated housing and the outer wall of a cylindrical jacket, the refrigerating unit being mounted in the space surrounded by said jacket, said space communicating at the ends of the jacket with the space between the housing and the jacket. In this manner a very rational utilization of the cooling air is obtained whereby the space requirements of the apparatus are further reduced, while at the same time the arrangement of the refrigerating unit inside the jacket further tends to reduce the space requirements. Thus, the cooling air is circulated in a concentrated manner about the articles to be frozen between the housing and the jacket. Moreover this construction solves a problem which is present in rectilinear refrigerating tunnels. When these are relatively long the cooling air will undergo a relatively great temperature increase during its movement from one end of the freezing tunnel to the other and the initial temperature of the air must thereafter be relatively low. In an apparatus according to the invention the flow path of the air may have the same length as in the case of a rectilinear freezing tunnel, viz., if a partition is provided between successive turns of the helical path, but it is an alternative, and preferred, possibility within the scope of the invention not to provide such partition and to arrange for the cooling air to flow substantially axially through the space between the housing and the jacket. In that case the flow path of the air will be shorter, and the freezing will therefore take place at a more constant temperature than in a freezing tunnel having the same capacity, which in many cases is beneficial to the quality of frozen articles.

Description of the preferred embodiment

Figure 1:
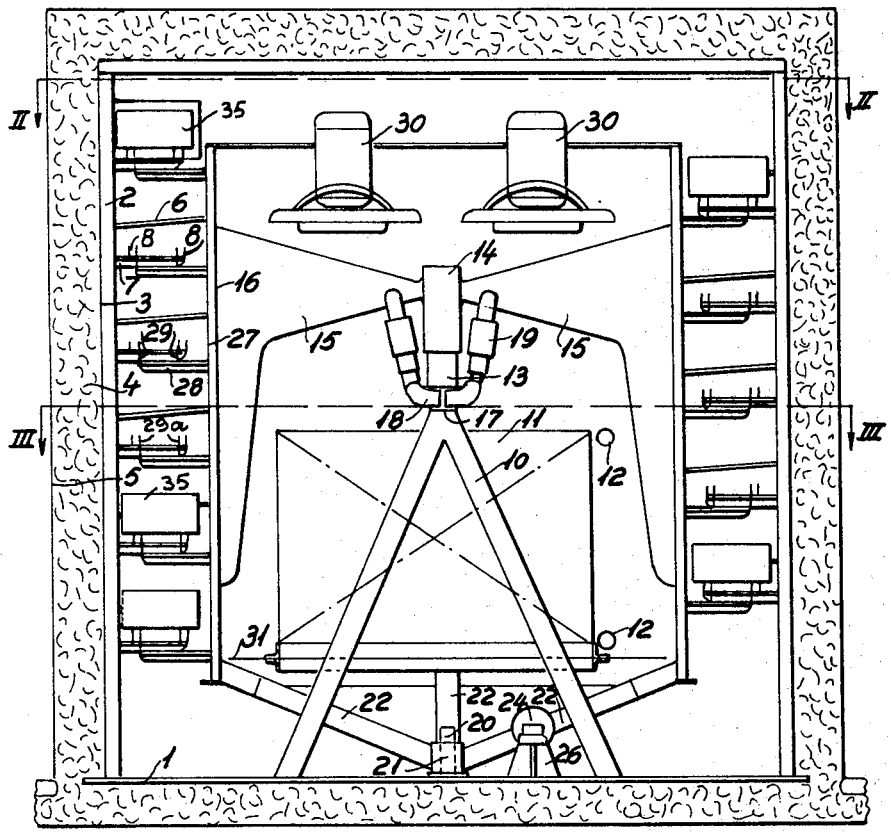
FIG. 1 shows a vertical section through a refrigerating apparatus according to one embodiment of the invention, FIG. 2 a horizontal section along the line II—II in FIG. 1, FIG. 3 a horizontal section along the line III—III in FIG. 1, and FIGS. 4–7 on a larger scale, a fractional section in developed view along the line IV—IV in FIG. 2 with the parts in four different positions.

In FIG. 1, 1 is a bottom plate to which a number of vertical channel bars 2 are attached in circumferentially uniformly spaced positions. On their outer sides, the channel bars are connected with each other by means of sheet material 3 and on the outer side of this sheet material there is arranged an insulation 4, which is surrounded by an outer covering 5. Thus, the channel bars 2 in combination with the sheet material 3, the insulation 4 and the covering 5 form a vertically disposed cylindrical housing. A guiding rail 6 is attached to the inner sides of the channel bars 2 and extends helically along the inner wall of the housing. Moreover, the channel bars carry brackets 7, FIG. 1, serving to support a set of supporting bars 8, 8 extending along a helice around the central axis 9 of the housing.

In the housing, a pair of frames 10 are mounted, one of which is seen in FIG. 1. A refrigerating unit 11, which is only diagrammatically shown in FIG. 1 of the drawing, is suspended from the frames 10. The refrigerating unit comprises a spiral tube or bundle of tubes, the inlet and outlet of which are indicated at 12, 12 in FIG. 1. Moreover, the two frames 10 carry a shaft 13, FIG. 1, on which a hub 14 is slidably and rotatably mounted. The hub is provided with a set of arms 15, the outer ends of which carry a cylindrical jacket 16. Another hub 17, which carries two brackets 18, to which one end of each of two hydraulic jacks 19 are connected, is rotatably, but non-slidably mounted on the shaft 13. The other ends of the hydraulic jacks are connected with two of the arms 15, and it will thus be seen that the hub 14 and thereby the jacket 16 can be displaced in a vertical direction, i.e., in the direction of the axis of the jacket, by means of the jacks 19. Moreover, the construction permits the jacket 16 to rotate about its longitudinal axis.

A further shaft 20 is fixedly mounted on the bottom plate 1 coaxially with the longitudinal axis of the jacket 16. A hub 21 is rotatably and slidably mounted on the shaft 20 and is connected with the lower end of the jacket 16 by means of four arms 22.

Figure 3:
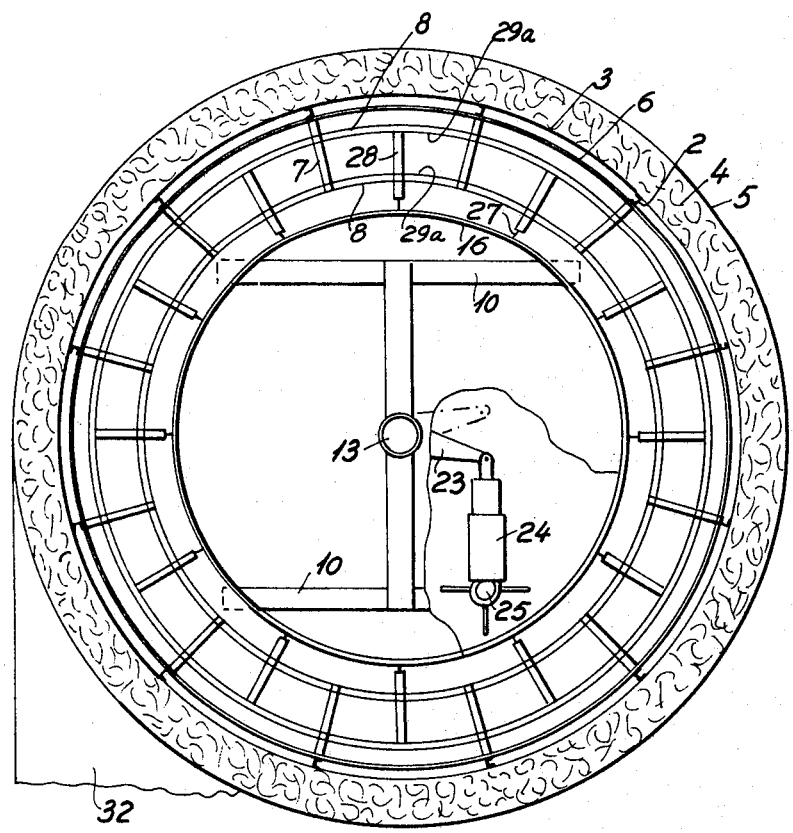

The hub 21 also carries an arm 23, FIG. 3, which is connected with one end of a hydraulic jack 24, the other end of which is connected with a support 26 mounted on the bottom plate 1, by means of a ball joint 25.

A plurality of longitudinal T-bars 27, FIG. 3, are attached to the outer side of the jacket 16, and to these brackets 28 are attached, which extend radially outwards in the space between the housing and the jacket. The brackets 28 are mounted along a helice having the same pitch as the helice along which the supporting bars 8, 8 are mounted. Each bracket 28 carries two upwardly extending conveying arms 29, to the upper ends of which a set of conveying bars 29a are attached between the bars of the set 8, 8 and at a distance above the brackets 7 of the latter.

At the upper end of the apparatus 2 blowers 30 are mounted, by means of which air can be circulated in a closed path, viz., through the refrigerating unit 11 and the space between the jacket 16 and the housing. It will be understood that the refrigerating unit 11 is open for the passage of air in a vertical direction, and to prevent air from flowing through the space between the outer side of this unit and the jacket 6 a plate 31 is mounted at the lower end of the refrigerating unit.

Figure 2:
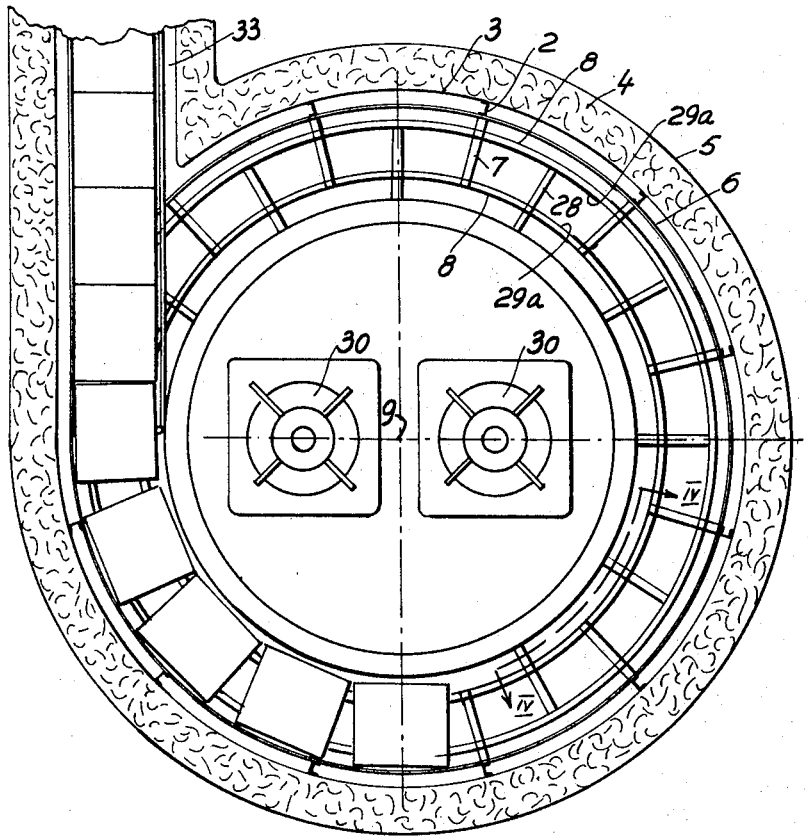

The housing has two tangential openings, viz., one opening 32, FIG. 3, at the lower end of the housing, and another opening 33, FIG. 2, at the upper end of the housing.

Figure 4:
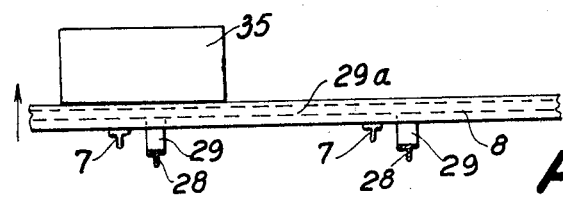
Figure 5:
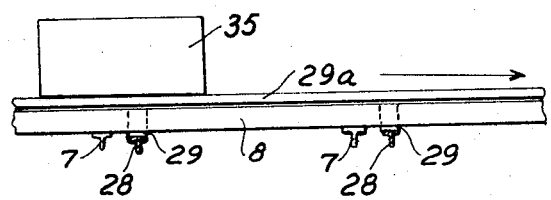
Figure 6:
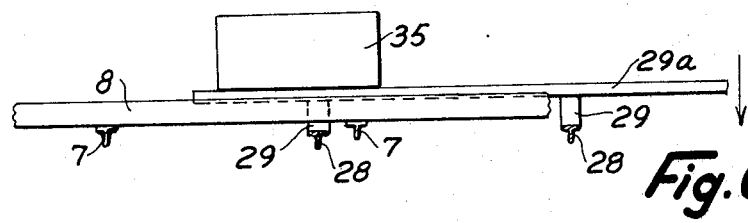
Figure 7:
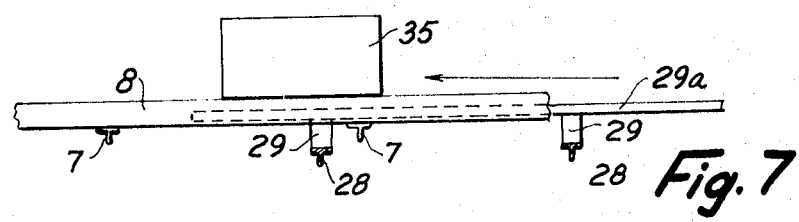

The operation of the described apparatus is as follows:

The articles to be frozen are supplied through the opening 32 at the lower end of the housing, but it is to be understood that alternatively the articles might be conveyed the opposite way through the freezing apparatus, i.e., the opening 33 might be used as supply opening. The articles are supplied to the opening 32 in any suitable manner not illustrated, e.g., by means of a belt conveyor, and the articles are pushed through the opening 32 onto the starting portion of the set of bars 8, 8. During their movement in the housing the articles are laterally guided by means of the guiding rail 6. The articles are conveyed through the freezing apparatus by means of a combined movement of the jacket 16 and thereby of the conveying bars 29a, caused by means of the jacks 19 and 26. This is particularly illustrated in FIGS. 4–7. When the parts assume the position illustrated in FIG. 4, the articles 35 are supported on the upper side of the stationary bars 8. By operating the jacks 19 the jacket 16 is elevated whereby its conveying bars 29a engage the underside of the articles 35 and elevate them above the bars 8 such as illustrated in FIG. 5. If the jack 24 is then operated, such as to become shortened, the jacket 16 is rotated in such a manner that the bars 29a and thereby the articles 35 supported thereon are rotated to the right, as illustrated in FIG. 6. Then the jacket 16 is again lowered by shortening the jacks 19, whereby the articles 35 are deposited on the set of bars 8 in a higher and further advanced position than previously, such as illustrated in FIG. 7. By thus moving the jacket 16 up and down along its longitudinal axis and forth and back about the same axis the articles may be conveyed intermittently through the apparatus and are at the same time refrigerated by means of the cooling air, which by means of the blower 30 is circulated in the manner described.

It will be observed that in the embodiment illustrated the jacket serves a double purpose, viz., both as a guiding wall for the flow of cooling air and as a conveying mechanism for the articles by feeding these forward step by step as a consequence of its combined axial and circumferential reciprocating movement.

Alternative means may be used within the scope of the invention for conveying the articles along the helical path. Thus, the articles may be placed so as to be slidable along the path, e.g., on rails, such as is known in freezing tunnels, and the articles latest introduced may push the previously introduced articles ahead in front of them.

It is to be observed that the word "helical," as used in this specification and in the appended claims, is intended also to comprise a stepped configuration extending generally along a helice. Thus in the embodiment described, if the supporting bars are given such a stepped configuration, the conveying mechanism described may be used for moving the articles from one horizontal step to the next horizontal step.

I claim:

1. A refrigerating apparatus comprising a cylindrical housing and a refrigerating unit enclosed within a cylindrical jacket, said jacket being disposed co-axially inside said housing so as to define an annular space between said housing and said jacket, blowing means for circulating refrigerating air through said refrigerating unit and said annular space, conveying means arranged along a helical path in said annular space wherein said conveying means comprises one set of helical supporting bars secured by bracket means to the interior side of said housing and one set of helical conveying bars secured by other bracket means to the exterior surface of said jacket, the helix of said set of supporting bars having the same pitch as the helix of said set of conveying bars, said jacket being mounted and provided with driving means in such a manner as to be movable back and forth in its axial as well as in its circumferential direction.

References Cited

UNITED STATES PATENTS

| | | | |
|---|---|---|---|
| 2,093,270 | 9/1937 | Glinka | 34—147 |
| 3,133,798 | 5/1964 | Feld et al. | 198—136 X |
| 3,173,276 | 3/1965 | Martin | 62—380 |
| 3,269,142 | 8/1966 | De Mola et al. | 62—381 |
| 3,315,492 | 4/1967 | Dreksler | 62—381 |

ROBERT A. O'LEARY, *Primary Examiner.*

W. E. WAYNER, *Assistant Examiner.*